(12) United States Patent
Cormack et al.

(10) Patent No.: US 8,850,404 B2
(45) Date of Patent: Sep. 30, 2014

(54) RELATIONAL MODELING FOR PERFORMANCE ANALYSIS OF MULTI-CORE PROCESSORS USING VIRTUAL TASKS

(75) Inventors: Christopher J. Cormack, Hillsboro, OR (US); Nathaniel Duca, Menlo Park, CA (US); Mike Burrows, Sammamish, WA (US); Serhat A. Tekin, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1013 days.

(21) Appl. No.: 12/645,568

(22) Filed: Dec. 23, 2009

(65) Prior Publication Data

US 2011/0154337 A1   Jun. 23, 2011

(51) Int. Cl.
*G06F 9/44* (2006.01)
*G06F 11/36* (2006.01)
*G06F 11/34* (2006.01)

(52) U.S. Cl.
CPC ...... *G06F 11/3612* (2013.01); *G06F 2201/865* (2013.01); *G06F 11/3466* (2013.01); *G06F 11/3409* (2013.01)
USPC ............ 717/131; 717/128; 717/132; 717/133

(58) Field of Classification Search
None
See application file for complete search history.

(56) References Cited

U.S. PATENT DOCUMENTS

| 6,047,122 A | 4/2000 | Spiller |
| 6,560,722 B1 | 5/2003 | Frankel et al. |
| 2003/0056200 A1* | 3/2003 | Li et al. ........................ 717/128 |
| 2005/0177775 A1 | 8/2005 | Qadeer et al. |
| 2006/0106846 A1 | 5/2006 | Schulz et al. |
| 2010/0241824 A1* | 9/2010 | Carlson et al. .................. 712/22 |

FOREIGN PATENT DOCUMENTS

GB    2471367 A  * 12/2010

OTHER PUBLICATIONS

British Patent Office, Combined Search and Examination Report issued in corresponding GB Application No. GB1020734.8, dated Mar. 25, 2011, 9 pgs.
Christopher J. Cormack et al., "Relational Modeling for Performance Analysis of Multi-Core Processors," U.S. Appl. No. 12/645,562, filed Dec. 23, 2009, 19 pages.
The State Intellectual Property Office of the People's Republic of China, Office Action mailed Feb. 21, 2014 in Chinese application no.

* cited by examiner

*Primary Examiner* — Kris Rhu
(74) *Attorney, Agent, or Firm* — Trop, Pruner & Hu, P.C.

(57) ABSTRACT

A relational model may be used to encode primitives for each of a plurality of threads in a multi-core processor. The primitives may include tasks and parameters, such as buffers. Implicitly created tasks, like set render target, may be visualized by associating those implicitly created tasks with actual coded tasks.

19 Claims, 4 Drawing Sheets

RELATIONAL MODELING FOR PERFORMANCE ANALYSIS OF MULTI-CORE PROCESSORS USING VIRTUAL TASKS

BACKGROUND

This relates generally to multi-core processors and, particularly, to performance analysis of multi-core machines.

Modern general purpose and graphics processors may include one or more cores. These processors may run a large number of threads. Therefore, analyzing the performance of a processor may involve a complex undertaking, given the number of tasks and the number of different threads that may be running.

Conventionally, a trace is a graphical depiction of a temporal sequence between tasks running on a processor. Software based trace analysis enables a software designer to understand the sequence of operations between tasks.

However, more sophisticated analysis may be needed with multi-core processors.

DETAILED DESCRIPTION

In accordance with some embodiments of the present invention, relationships, other than temporal sequencing, may be visualized between chunks of code called tasks. A task is any common unit of work for scheduling and execution. It can be any portion of code with a beginning and an end. Its duration may be defined as a number of cycles to execute the task.

Traces are links between tasks. A relational model gives the relationship between tasks in terms of parent to child, sibling, dependency, and producer and consumer. Other relationships may also be used.

The parent/child relationship exists between a first task and a second task, spawned by the first task. A dependency exists between a first and a second task when the first task depends on the second task to execute. A producer/consumer relationship means that a first task creates data and places it in a buffer and a second task consumes that data from the buffer.

A primitive is any entity that is a party to a relationship. A task is one type of primitive. Another primitive is called a parameter. A parameter may be a buffer, a name-value pair, a string, or any kind of normal data type or structure that has a relationship to a task. Other primitives may also be used.

Figure 1:
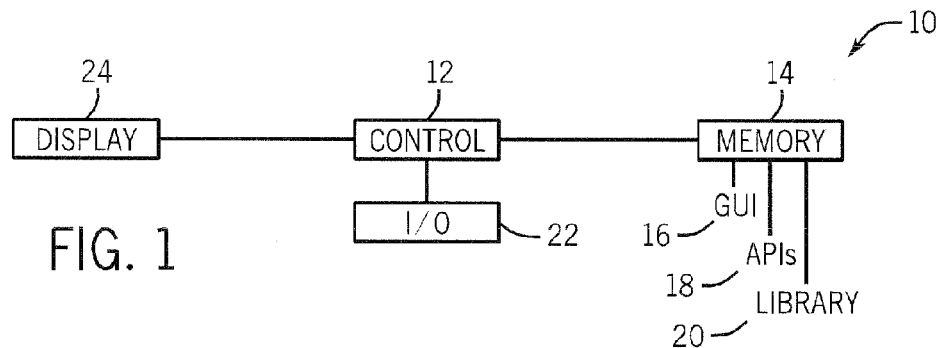
FIG. 1 is a schematic depiction of one embodiment of the present invention.

Referring to FIG. 1, the performance analysis tool 10 may include a control 12, which may be a processor. The processor may be a multi-core processor. In one embodiment, it may be a graphics processor and, in one embodiment, it may be a single instruction multiple data (SIMD) multi-core processor. The control 12 is coupled to a memory 14, which may store a graphical user interface or front end of the tool 16, a number of sequences or application program interfaces (APIs) 18, which encode the primitives and the relationships between primitives and a library 20, which provides the toolbox of features that can be utilized. The control may be coupled to an input/output 22 to allow the user to input information and to receive an output. A display 24 may be used to visualize the relationships between primitives, including tasks.

The performance analysis tool 10 is used by software developers to enhance the performance of their software by understanding the relationships between primitives, such as tasks within that software. By understanding these relationships, the software developer can understand how to improve the software performance.

Generally, the software developer develops two versions of the code. One version of the code is the code which merely executes the desired function, such as a game. The other version of the code includes within it the APIs 18, which create the visualizations of the primitive relationships, in some embodiments (while, in other embodiments, binary outputs can be used without visualizations for further analysis). The version of the code with the APIs is called the instrumented code. Streaming the instrumented code to the front end graphical user interface 16 enables the designer to see what is going on in the code. It shows the threads that are running in the code, the tasks within the threads, and, most importantly, the functional relationships between those tasks.

Figure 2:
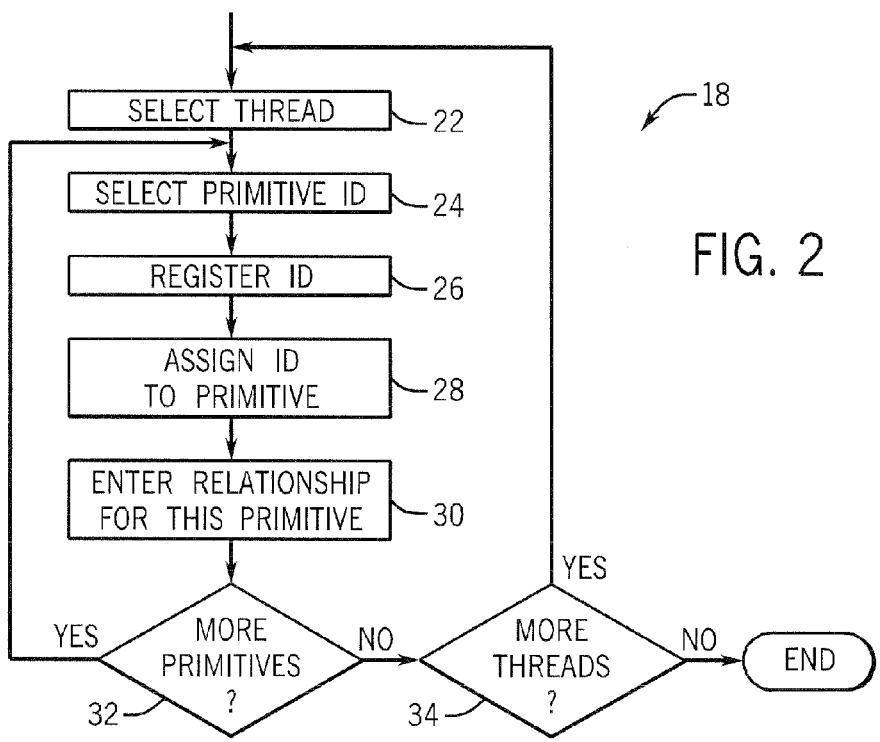
FIG. 2 is a flow chart depicting a sequence used by the embodiment shown in FIG. 1.

Referring to FIG. 2, the sequence implemented by the application program interfaces 18 begins by receiving the selection of a thread, as indicated in block 22. Next, a primitive identifier is selected, as indicated in block 24. The identifier is registered in block 26. Then, the identifier is assigned to a primitive in block 28.

At this point, the designer then enters the relationships between a selected primitive and other primitives. The selected primitive is called the "this" primitive and the primitives that the this primitive has relationships with are called the "that" primitives.

In some embodiments, the sequence 18 automatically implies a number of relationships beyond those entered by the designer. For example, if a first task is the parent of a second task, it is implied that the second task is the child of the parent. Similarly, if a first task is related to a second task and the second task is related to a third task, it is implied that the first and third tasks are also related and the nature of the relationship can be implied. This may be referred to as transitive relationships or relationships that are implied from other relationships. The use of transitive relationships, in some embodiments, reduces the data entry burden on the user. In addition, there may be one to N or fan out relationships. For example, a single parent may spawn any number of children and all of those children do not need to be separately encoded in some embodiments.

In addition, the sequence 18 provides time stamps for each of the primitive identifiers. It also provides the time when any task begins and ends as an output. Thus, in one embodiment, it can display a series of threads as rows in a chart. Each row may include the sequence of tasks in the thread. In addition, nested tasks may be indicated as well, by visualization, such as showing the nested task as extending out of the task within which it executes. A user can click on a particular task and, in response to the selection of the task, its relationships may be graphically displayed.

As opposed to tracing systems which are time based, the system 10 may be relationship based. The temporal relationship between tasks and different buffers is less important than the relationships between them. In some embodiments, relationships within tasks are shown, even where their relative timing is not, in some embodiments. Thus, within the thread, the time sequence of tasks may be illustrated, but the temporal sequence of tasks in different threads may not be displayed in some embodiments. In some embodiments, functional, as opposed to temporal, relationships may be visualized. A functional relationship is any relationship other than the temporal sequence between tasks.

In one embodiment, each task may be represented by a rectangle whose length in the x direction is a function of how long it takes to execute. In some embodiments, a mouse click and drag technique can be used to select a number of tasks to display the relationships between those selected tasks and any other tasks.

Figure 3:
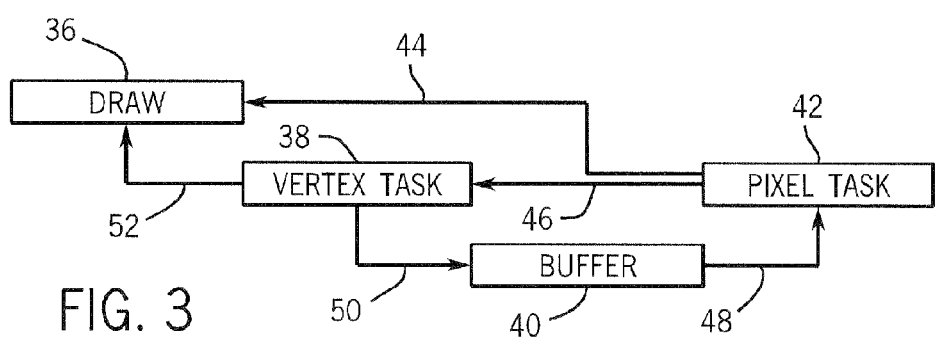
FIG. 3 is a visualization of a task based relational model in accordance with one embodiment of the present invention.

Thus, as a simple example, referring to FIG. 3, there are four primitives, including three tasks 36, 38, and 42 and one parameter in the form of a buffer 40. The arrows 44, 52, 50, and 48 show the relationships between the tasks. For example, the vertex task 38 may place its results in the buffer 40 and those results may be used by the task 42. Thus, the task 38 is the producer and the task 42 is the consumer. Since the vertex task 38 was created by the draw task 36, the arrow 52 indicates that the vertex task is the child of the draw task 36. Similarly, the pixel task 42 depends on the vertex task 38 to execute and, therefore, the dependency is indicated by the arrow 46. Thus, in some cases, there may be multiple relationships between tasks. In addition, there may be multiple object types.

Returning to FIG. 2, after assigning the identifier to the primitive in block 28, the relationships for this primitive are then entered, as indicated in block 30. While a manual technique is described herein, automatic techniques are also contemplated wherein code analysis results in automatic entry of relationships without user intervention.

Then, in diamond 32, a check determines whether there are any more primitives to encode. If so, the flow iterates. Otherwise, a check at diamond 34 determines whether there are more threads to encode. If so, the flow iterates. Otherwise, the flow ends.

Figure 4:
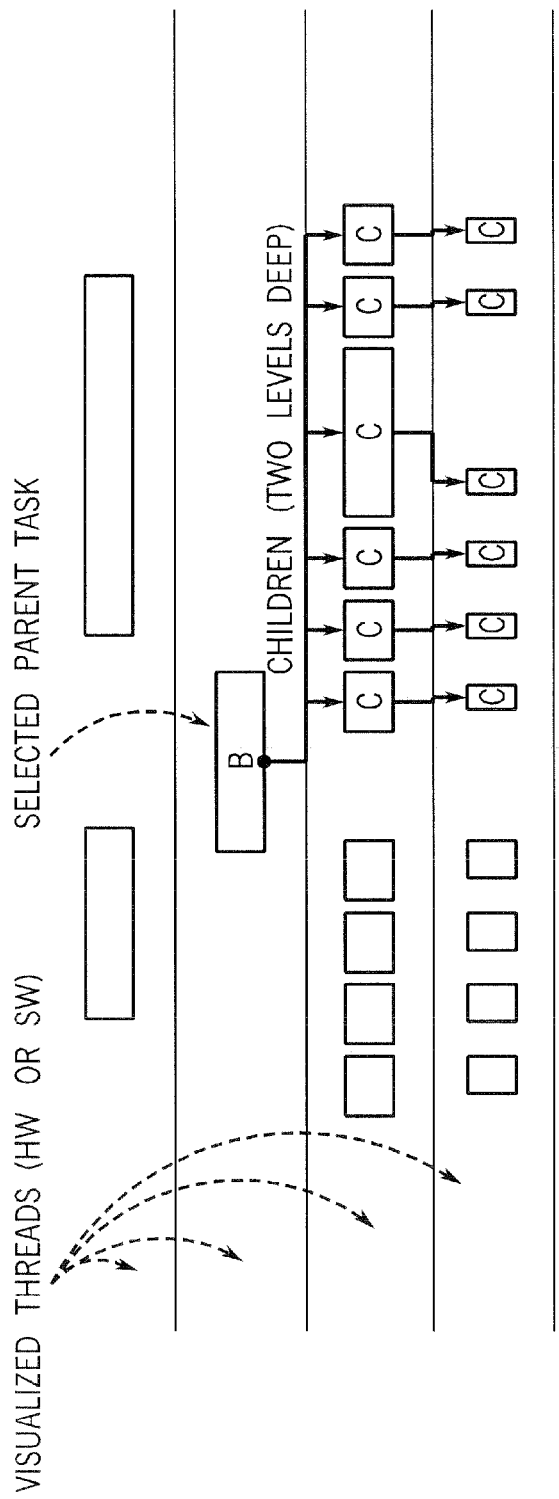
FIG. 4 is a visualization of a parent/child relationship produced in accordance with one embodiment of the present invention.

FIG. 4 shows an example of a visualization for a parent/child relationship. In one embodiment, the visualization may be a graphical user interface with mouse selectable task or primitive depictions. In this example, only four threads are shown. For each thread, the tasks are indicated by rectangles.

In this case, the user has selected a parent task B in the second thread. In response thereto, the visualization of the parent/child relationship is automatically generated. Namely, arrows extend from task B to a series of tasks C in the third thread, which are children of the task B. Moreover, arrows extend from the task C in the third thread thereon to task C in the fourth thread, which are grandchildren of the parent task B.

Figure 5:
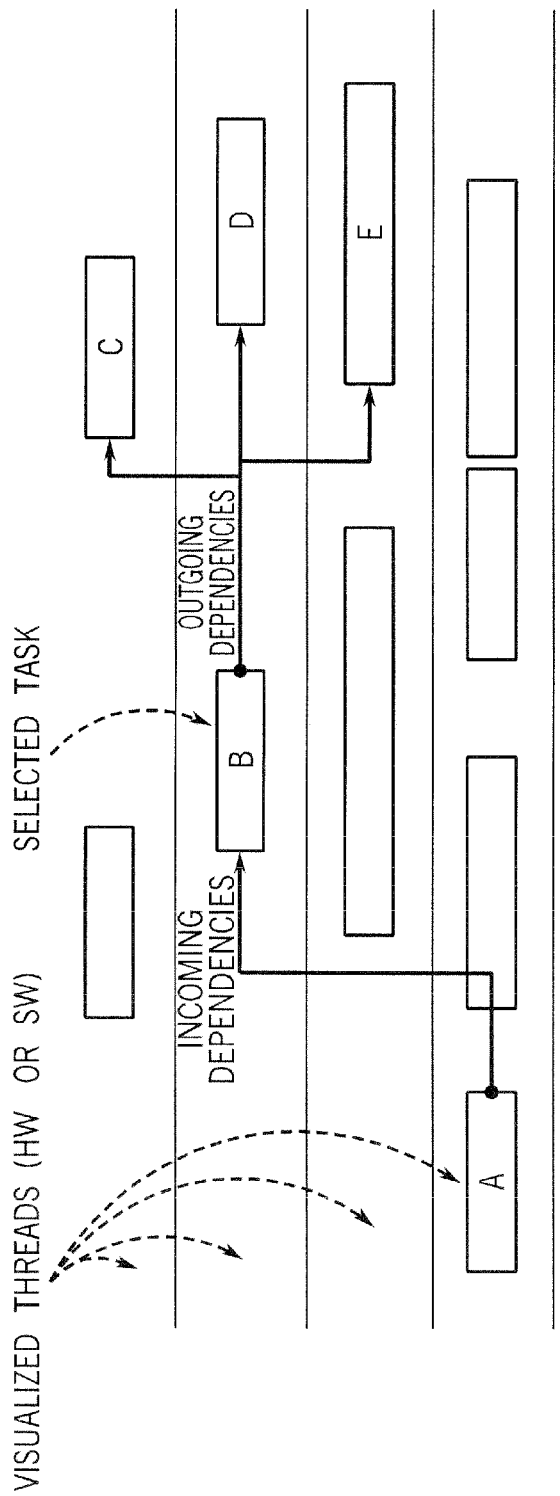
FIG. 5 is a visualization of dependencies relationships in accordance with another embodiment of the present invention.

FIG. 5 is a visualization of a dependencies relationship. It corresponds to FIG. 4, except now the user selected task B has dependencies to tasks A, C, D, and E. Namely, the task B is dependent on inputs from the task A, as indicated by the arrow labeled "incoming dependencies." The tasks C, D, and E are dependent on task B for its outputs, labeled "outgoing dependencies." Thus, the visualization shows the functional relationship between tasks in different threads.

In some graphics applications, such as rendering passes, the techniques described heretofore would not enable task visualization. However, the rendering pass may be a useful measure of work performed by a program and may be a desirable tool for profiling at an application developer level.

Because the graphics application program interface does not contain an explicit function that actually represents a rendering pass, it would not be coded using the techniques described heretofore because the rendering pass is implicitly created during a series of API calls. Thus, such an implicitly created task may be visualized using a virtual task. As a more concrete example, the following example of calls may be made in the Direct X API:

```
SetRenderTarget(1)
Draw(draw_args_1)
Draw(draw_args_2)
SetRenderTarget(2)
Draw(draw_args_3)
```

What happens in this code is that draws 1 and 2 are part of the first rendered target's work, while draw 3 is part of the second render target's work. This work is executed in hardware and only the commands that result in the work themselves are the drawing commands. The set render target commands are merely state settings and create no work themselves. To solve this issue, a virtual task may be used in some embodiments. The virtual task may be created in the set render target call:

```
SetRenderTarget(x) {
    TAL_BeginVirtualTask("RenderTarget");
    TAL_SetCurrentTaskID(x->renderTargetID);
    TAL_EndVirtualTask( )
}
```

With the regular task, the time stamp of the begin and end calls is recorded since the duration of the task may be of interest. However, in the example with the set render target above, the actual task is over as soon as it is done; rather, it is a place holder for real work that will be done later.

To give a virtual task actual duration, other non-implicitly created or actual coded tasks may be associated with the virtual task. For example, when a draw call task is created, that draw call task is a child of the actual virtual task. With this concept of a virtual task, the duration of a set render target may be given a duration, presenting the user with a list of render target virtual tasks and computing their duration based on all of their related tasks.

Figure 6:
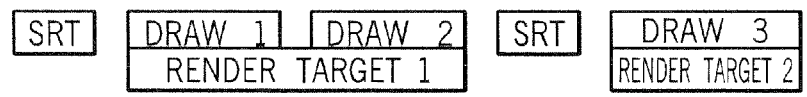
FIG. 6 is a depiction of a virtual task visualization in accordance with one embodiment.

Then the virtual tasks may be visualized in a time line, as represented in FIG. 6, by using the minimum and maximum of its child task. From the parent/child relations the visualization, shown in FIG. 6, may result. For example, the underlying task of rendering the target one may be drawn as a child of draw 1 and draw 2 and render target two may be shown as a child of draw 3. Thus, the render target 1 and render target 2 get a duration, even though the duration is basically the duration of the associated draw calls, such as draw 1 and draw 2, in the case of set render target 1 and draw 3 in the case of set render target 2.

Figure 7:
FIG. 7 is a depiction of another virtual task visualization in accordance with one embodiment.

The virtual tasks may also be useful for showing more information about complex tasks so that basic profiling can be done without detailed information. In the render target example, only the virtual task (render target 2, render target 3) may be shown in an application run, as shown in FIG. 7. With a large number of threads, this may be more clear than the depiction shown in FIG. 6, in some cases. For example, with 128 different threads, each of which itself contains hundreds of thousands of tasks, the set render target 2 executes the longest and set render target 3 is likely dependent on set render target 2's completion. This insight can enable the designer to either stop profiling and immediately take action, perhaps by allowing set render targets 2 and 3 to co-execute, or by optimizing set render target 2, now that it is known that it is a time consumer.

Figure 8:
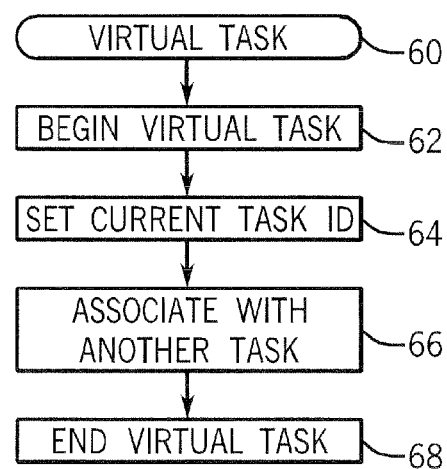
FIG. 8 is a flow chart for one embodiment.

Referring to FIG. 8, the sequence 60 for entering a virtual task may be a module or a part of an API 18, shown in FIG. 2. Initially, the virtual task is begun, as indicated in block 62, as if it were a real task. Then, also as if the virtual task was a real task, a current task identifier is set in block 64. Next, the task is associated with another task in block 66. For example, the set render target virtual task may be associated with one or more draw calls, as illustrated, for example, in FIG. 6. This association provides a virtual task duration. Finally, the virtual task is ended (block 68).

In short, virtual tasks may be useful for building profiling tools for complex, highly parallel software. Without them, the profiling tool may not be able to show anything more than the mechanism executing an API, which may prevent gaining simple and critical performance insights in some cases. Using virtual tasks, an abstraction is obtained that allows such issues to be more clear from the start, enabling more productive and efficient top down profiling, in some embodiments.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, in an application programming interface (API) of instrumented code corresponding to a version of code, an identification of an implicitly created task of the instrumented code, the instrumented code to be executed in a multi-core processor;
   associating said implicitly created task with at least one actual coded task of the instrumented code and using a duration of the at least one actual coded task to indicate a duration for the implicitly created task wherein the implicitly created task was implied from the at least one actual coded task; and
   providing, via a display of a system, a visualization of a relationship between the actual coded and implicitly created tasks and including a graphical representation of the duration of the implicitly created task based on a minimum and a maximum of the at least one actual coded task;
   wherein an implicitly created task is one that is logically derived from an actual coded task and a transitive relationship, without user intervention.

2. The method of claim 1 including indicating the relationship between the tasks.

3. The method of claim 2 wherein indicating a relationship between the tasks includes indicating the duration for the implicitly created task.

4. The method of claim 1 including using the duration of more than one actual coded task to indicate the duration for the implicitly created task.

5. The method of claim 1 including receiving an identification of a set render target as said implicitly created task.

6. The method of claim 5 including associating said set render target with at least one draw call.

7. The method of claim 6 including displaying said set render target as a child of the draw call.

8. A non-transitory computer readable medium storing instructions executed by a computer to:
   receive, in an application programming interface (API) of instrumented code corresponding to a version of code, an identification of an implicitly created task of the instrumented code, the instrumented code to be executed in a multi-core processor;
   associate said implicitly created task with at least one actual coded task of the instrumented code and using a duration of the at least one actual coded task to indicate a duration for the implicitly created task wherein the implicitly created task was implied from the at least one actual decoded task; and
   provide, via a display, a visualization of a relationship between the actual coded and implicitly created tasks and including a graphical representation of the duration of the implicitly created task based on a minimum and a maximum of the at least one actual coded task;
   wherein an implicitly created task is one that is logically derived from an actual coded task and a transitive relationship, without user intervention.

9. The medium of claim 8 further storing instructions to indicate the relationship between the tasks.

10. The medium of claim 8 further storing instructions to use the duration of more than one actual coded tasks to indicate the duration for the implicitly created task.

11. The medium of claim 8 further storing instructions to receive an identification of a set render target as said implicitly created task.

12. The medium of claim 11 further storing instructions to associate said set render target with at least one draw call.

13. The medium of claim 12 further storing instructions to display said set render target as a child of the draw call.

14. An apparatus comprising:
   a multi-core processor; and
   a memory coupled to said multi-core processor, said memory storing instructions to receive, in an application programming interface (API) of instrumented code corresponding to a version of code, an identification of an implicitly created task in the multi-core processor, associate said implicitly created task with at least one actual coded task, and use a duration of the at least one actual coded task to indicate a duration for the implicitly created task, provide, via a display, a visualization of a relationship between the actual coded and implicitly created tasks and including a graphical representation of the duration of the implicitly created task based on a minimum and a maximum of the at least one actual coded task, and wherein an implicitly created task is one that is logically derived from the actual coded task and a transitive relationship, without user intervention.

15. The apparatus of claim 14, said apparatus to indicate the relationship between the tasks.

16. The apparatus of claim 14 wherein said apparatus is a graphics processor.

17. The apparatus of claim 16 wherein said apparatus is a single instruction multiple data multi-core processor.

18. The apparatus of claim 14, said apparatus to provide a visualization of the duration.

19. The apparatus of claim 14, said apparatus to use the duration of more than one actual coded tasks to indicate the duration of the implicitly created task.

* * * * *